United States Patent [19]

Robertsson

[11] 4,227,261
[45] Oct. 7, 1980

[54] TRANSMISSION OF INFORMATION BY SWEEPING FAN-SHAPED BEAMS

[75] Inventor: Hans R. Robertsson, Jönköping, Sweden

[73] Assignee: Saab-Scania AB, Linköping, Sweden

[21] Appl. No.: 14,116

[22] Filed: Feb. 22, 1979

[30] Foreign Application Priority Data

Mar. 2, 1978 [SE] Sweden .............................. 7802349

[51] Int. Cl.³ ...................... G01B 11/26; H04B 9/00; F41F 22/00; F41G 3/26
[52] U.S. Cl. ...................................... 455/600; 35/25; 89/41 L; 235/412; 273/312; 356/5; 356/152; 455/603
[58] Field of Search .................... 35/25; 273/102.2 R, 273/102.2 B; 356/4, 5, 152; 250/199, 203 R; 89/41 L; 364/423; 235/412; 455/603

[56] References Cited

U.S. PATENT DOCUMENTS

| | | | |
|---|---|---|---|
| 3,007,635 | 11/1961 | Miner et al. | 235/412 |
| 3,056,129 | 9/1962 | Albersheim | 343/11 VB |
| 3,484,167 | 12/1969 | Burns, Jr. | 356/5 |
| 3,588,108 | 6/1971 | Ormiston | 273/102.2 R |
| 3,609,883 | 10/1971 | Erhard | 35/25 |
| 3,832,791 | 9/1974 | Robertsson | 35/25 |
| 3,907,433 | 9/1975 | Nault | 35/25 |
| 4,007,991 | 2/1977 | Robertsson | 356/152 |
| 4,134,008 | 1/1979 | Corlieu | 356/152 |

FOREIGN PATENT DOCUMENTS

| | | | |
|---|---|---|---|
| 2149701 | 4/1973 | Fed. Rep. of Germany | 35/25 |
| 1161027 | 8/1969 | United Kingdom | 244/3.16 |

*Primary Examiner*—S. C. Buczinski
*Attorney, Agent, or Firm*—Nilles & Custin

[57] ABSTRACT

Fan-shaped beams, sweeping angularly, substantially flatwise, across a solid angle space having the beam emitter at its apex, are modulated for transmission of special information to a selected one of a plurality of identically equipped bodies in that space. Whenever beam radiation reflected from a body is detected at the emitter, distance to the reflecting body is measured on the basis of radiation out-and-back time. If the body is at a distance for which special information is valid, the beam is modulated with such information for as long as its reflection from that body is received. A complete beam sweep cycle has a predetermined duration. As a basic condition for acceptance of special information, a body must receive such information on all beams during a predetermined time interval of at least that duration. As a further condition, a beam may be modulated with a characterizing sign whenever it intersects two bodies substantially simultaneously, and special information will be accepted at the body only if at least one beam lacks the characterizing sign.

7 Claims, 7 Drawing Figures

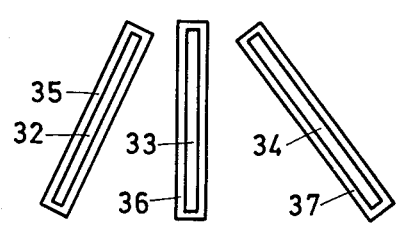
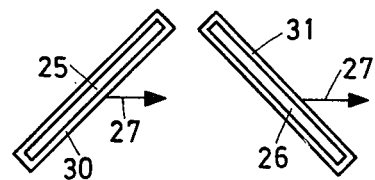
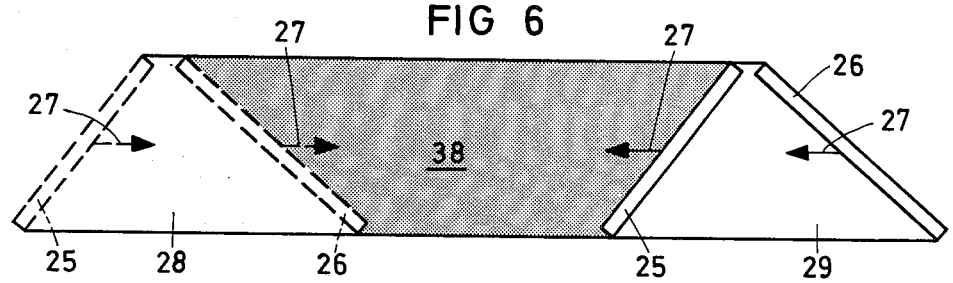
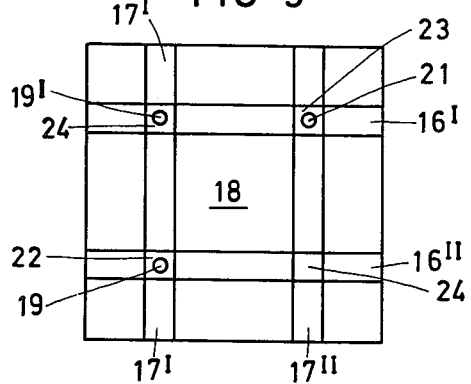

TRANSMISSION OF INFORMATION BY SWEEPING FAN-SHAPED BEAMS

FIELD OF THE INVENTION

This invention relates to the transmission of information by means of modulated, angularly sweeping, fan-shaped beams of radiation; and the invention is more particularly concerned with a method and means for delivering information so transmitted exclusively to one of a plurality of bodies that may be present in a space swept by such beams, which one body is at a predetermined distance from a location from which the beam radiation is emitted.

BACKGROUND OF THE INVENTION

U.S. Pat. No. 4,007,991 disclosed a system wherein two fan-shaped beams of radiation, emitted from a location at the apex of a pyramid-shaped space, were swept flatwise angularly across that space for transmitting position information to bodies present in the swept space. Each beam had its longer cross-section dimension oriented at right angles to that of the other, and each beam was swept transversely to its said long dimension. Position information encoded in modulation of each beam signified the momentary angular position of the beam in its sweep. Hence a body receiving radiation from both beams could obtain information concerning its location relative to two of the three coordinates that fully defined its position. However, for the purposes for which the system was intended there was no need for information to be available at the body concerning its distance from the radiation emitter and accordingly the patent does not disclose means for making distance information available at the body.

U.S. Pat. No. 3,484,167 disclosed a system wherein angularly sweeping beams were used for transmitting distance information as well as bearing and altitude information from a leader aircraft to follower aircraft flying formation on it. Under the operating conditions for which the system was intended, wherein follower aircraft tended to maintain well established positions relative to one another and to the leader aircraft, there was little or no likelihood that one of the follower aircraft might receive position information intended for another. The patent reflects no recognition of the problem of delivering position information exclusively to one of several bodies capable of receiving it, much less does it suggest how that problem might be solved.

An earlier system in which swept beams were used to convey information to bodies in the space swept by the beams is disclosed in British Pat. No. 1,161,027. Here again there was no attempt to restrict delivery of the transmitted information to only that one of several bodies in the swept space that was at a predetermined distance from the transmitter.

It is of course well known that when emitted radiation is reflected back to its source from a body in a space into which the radiation is emitted, the distance between the source and the body can be readily determined on the basis of the time required for the radiation to travel to and from the body. Thus, by means of so-called range gating, as pointed out in U.S. Pat. No. 3,056,129, it is possible to determine at the beam emitter station the exact position of one of several bodies in a space swept by the beams, provided the bodies are at different distances from the station and that said one body is at a predetermined distance from the station, or within a predetermined range of distances therefrom. Similarly, there is no difficulty in encoding distance information along with other position information in the modulation of a beam, as is evident, for example from the disclosures of U.S. Pat. No. 3,484,167 and U.S. Pat. No. 4,007,991.

Heretofore, however, it has not been known how to transmit such distance information exclusively to one of several bodies that might be present in the space swept by the beams, unless each body was equipped with means for accepting only information that was specifically addressed to it and it was possible to identify each individual body at the beam emitter location so that information intended only for a selected one of the bodies could be correctly addressed to it.

There are many practical applications for which a solution to this problem has been needed, some of which will be immediately apparent to those familiar with this field of art. By way of illustration, one such application—for which the present invention is especially suitable—is in connection with a system for scoring simulated firing of a fixed or mobile weapon at targets which may be fixed or moving and which are equipped with retroreflectors by which radiation emitted from the weapon location can be reflected back to that location. In that application, periodically sweeping radiation beams can be employed for ascertaining the position of a target at which the weapon has been aimed, so that the position of the target can be compared with that of an imagined projectile as it moves along a trajectory calculated on the basis of the orientation of the weapon barrel axis at the instant of simulated firing. At the instant when the imaginary projectile terminates its calculated trajectory, the same beams can be employed to transmit information to the target, from which a calculation can be made at the target of the results achieved with the simulated projectile. The calculated results can be displayed at the target, as by a simulation (e.g., smoke puff or flash) of the effects the imaginary projectile would have produced had it been a real one.

Simulated target practice equipment generally capable of performing the functions just described is disclosed in U.S. Pat. No. 3,832,791, but in the system of that patent the radiation was not emitted in the form of sweeping beams but, instead, in the form of a stationary beam that had substantial divergence. The vertical divergence of the beam was equal to the angle through which the weapon barrel could be swung in elevation, and its horizontal divergence was such that at the minimum shooting distance the beam had a width equal to the breadth of the target. The divergent beam avoided problems arising from the difference between the curving trajectory of a real projectile and the straight path of radiation, but its divergence made for low signal strength and a poor ratio of signal-to-background disturbance at the radiation detectors. With the use of sweeping fan-shaped beams that have very little divergence in one dimension transverse to the direction of propagation, high signal strength is available at all receivers, due to the low diffusion of each beam.

The divergent beam used in the prior weaponry scoring system also had the serious disadvantage that two or more radiation receivers within its relatively broad field of radiation could receive information transmitted by means of it.

This latter disadvantage was of substantial practical importance because in simulated gunnery practice exercises it is often desirable or necessary to have several targets located within a small portion of the field of view that is seen from the weapon position. By contrast, the present invention affords a satisfactory solution to the above-explained problem of selective delivery of information encoded in flatwise sweeping fan-shaped beams and thus makes it feasible to employ such beams in a system for simulated gunnery scoring, opening new possibilities for extending the scope of training with the use of such systems and increasing the accuracy and realism of scoring. With such a system, each target could comprise a reflector co-located with a detector of beam radiation. Assume, then, that several such targets were at different range distances from a weapon position from which sweeping beams were emitted but were at apparently small distances from one another in azimuth and/or elevation. With selective delivery of information to such of those targets that satisfied a range criterion for delivery of the information, beam transmissions could include information about the type of ammunition assumed to be fired, as well as information about the exact placement of the imagined projectile relative to the reflector-detector position of a target found to be at a range distance from the weapon equal to the calculated range of the imaginary projectile, and hit effects could be evaluated at the target on the basis of its own relative vulnerability. If two or more such targets happened to be at that same range distance, a similar transmission and calculation could be made for each. Such scoring—not merely of hits and misses but of precise hit effects—obviously requires delivery of transmitted information only to the detector or receiver for which it is intended, since scoring results would be confused if the transmitted information could be indiscriminately delivered to targets at any range. It is also obvious that in such a weapons practice system it would be impracticable to require information transmitted to a target to include an address specific to the particular target, since such a requirement would impose severe restrictions on target mobility and would thus limit the training value of the system.

With these considerations in mind, it is the general object of this invention to provide a method and means for transmitting information by means of modulated, fan-shaped, flatwise sweeping beams of radiation, whereby such information can be delivered exclusively to one of a plurality of bodies that are present in a space swept by the beams and are equipped for reflecting beam radiation back to the location from which the beams are emitted, a condition for such delivery being that said one body is at a distance from said location that is appropriate for its receipt of the information, and delivery of the information then being effected exclusively to that one body even though all other bodies present in that space would be capable of receiving and accepting the same information if they were at the position occupied by that one body.

A modified form of the invention is directed to the solution of the complicated special case problem that arises when two (or more) reflecting bodies present in a space being swept by such beams are simultaneously intercepted by one of the beams in a particular angular position of its sweep, and information is to be transmitted only to the one or more of said bodies that are at a distance from the transmitter location that is appropriate for its or their receipt of the information.

A further modified form of the invention is directed to the further complicated problem that arises when more than two bodies are present in the space swept by beams, and certain of those bodies—but not all of them—are at a distance from the transmitter location such that information to be transmitted is valid for said certain bodies but not for any other body.

Another important object of the invention is to provide for selective delivery of information to bodies in a space swept by flatwise angularly sweeping fan-shaped beams of radiation, with the beams serving as the transmission medium, where the particular information to be delivered to a particular body in that space is dependent upon the position of that body in range relative to a station from which the beams are emitted or upon its position relative to said station both in range and in a function of momentary angular positions of two or more of the beams at the times of their interception by the body.

The invention has other objects which will appear as the description proceeds and which are related to specific application of the use of flatwise-swept fan-shaped beams to a simulated weapons fire scoring system, to enable such a system to have substantially greater versatility than prior systems of the same general type with respect to the types of weapon fire and targets that can be simulated, and also to enable such a system to have greater accuracy in the scoring of results.

Insofar as the present invention is related to a simulated weapons fire practice system employing fan-shaped beams of radiation, it is closely related to the subject matter of my copending application Ser. No. 14,115. Insofar as the present invention is concerned with systems that may also involve the problem of unambiguous measurement of the positions of bodies that may be present in a space swept by fan-shaped beams, it is related to the subject matter of my copending application, Ser. No. 14,117. Those two copending applications thus supplement the disclosure hereof.

SUMMARY OF THE INVENTION

From a method standpoint, the objects of the invention are achieved in a system wherein information is transmitted by modulation of at least two fan-shaped beams of radiation emitted from a location at the apex of a solid angle space in which a plurality of bodies may be present, each beam being long and narrow in cross-section, the several beams having their respective long cross-section dimensions differently oriented, and each being swept angularly across said space substantially transversely to its long cross-section dimension in the course of a sweep cycle of a predetermined duration during which every beam makes at least one sweep across said space; and each of said bodies having means for reflecting beam radiation back to said location, means for detecting beam radiation received from said location and means for accepting or rejecting information contained in modulated beam radiation, said method being characterized by: at said location, by measurement of the time required for the radiation of each of said two beams to be returned to said location by reflection, ascertaining, as to each of the bodies from which reflected beam radiation is returned, whether or not the body is at a distance from said location for which certain information is valid for it; modulating each of said two beams in correspondence with said certain information only during the time in its sweep when reflection of the radiation of that beam, received at said location, is ascertained to be from a body at said distance; and at each body, accepting said certain information only when radiation modulated in correspondence therewith is ascertained to have been received from both of said two beams, within a predetermined time interval which has a duration at least as long as that of said sweep cycle. In a modification of the invention, whenever during the sweep of a beam reflections of the radiation of that beam are returned to said location substantially simultaneously from plural bodies, only one of which is ascertained to be at said predetermined distance, said information is accompanied by a characterizing sign in beam modulation, and at each body said information is accepted only upon the further condition that the received radiation of at least one of the beams is not modulated to include said characterizing sign. In another modified form of the invention, the field within which reflected radiation of each beam can be received at said location is so limited that said field has a cross-section which corresponds in shape, size and orientation with that of the beam and sweeps in unison with the beam so as to be substantially coincident with the beam.

From an apparatus standpoint the objects of the invention are achieved by means comprising: beam generating means at a location at the apex of a solid angle space in which a plurality of bodies may be present, for emitting during the course of a sweep cycle of predetermined duration each of a plurality of modulated, fan-shaped beams, each having a long, narrow cross-section and having its long cross-section dimension oriented differently than the others, and for causing each of said beams to sweep angularly across the whole of said space in a direction substantially transverse to its long cross-section dimension; reflector means on each of said bodies whereby radiation reaching the body is reflected back to the source from which it was emitted; detector means at said location for detecting beam radiations reflected back to said location from bodies in said space; measuring means at said location, connected with said beam generating means and said detector means, for ascertaining, on the basis of time required for radiation of each beam to be returned to said location by reflection, whether or not each body that reflects beam radiation back to said location is at a distance from said location for which certain information is valid for the body; modulating means at said location for modulating each beam in correspondence with said certain information; control means at said location, connected with said measuring means and with said modulating means, for modulating each of at least two of said beams in correspondence with said certain information only during times when reflection of that beam is detected by said detector means and such reflection is ascertained to be returned from a body which is at said distance from said location; other detector means, at each body, for detecting modulated beam radiation; and gate means at each body, connected with said other detector means and with clock means, for accepting said information only upon condition that radiation modulated in correspondence with said information is received at the body from each of said at least two beams during the course of a predetermined time interval having a duration at least equal to that of said sweep cycle.

BRIEF DESCRIPTION OF DRAWINGS

In the accompanying drawings, which illustrate embodiments of the invention now regarded as the preferred modes of practicing its principles:

FIG. 3 is a view in cross-section taken through a space swept by flatwise-sweeping fan-shaped beams, showing how information intended only for a particular body in that space could be received at another body if the principles of the present invention were not applied to the transmission and reception of that information;

FIG. 4 depicts diagrammatically the application of a special characterizing sign used in the transmission of information in accordance with one mode of practicing the present invention in order to restrict delivery of such information exclusively to one receiving body for which it is intended;

FIG. 5 is a diagrammatic representation of the cross-section of a pair of cooperating beams generated in accordance with the principles of this invention, said beams being shown in relation to detector scanning windows that are associated with the respective beams in accordance with a modified embodiment of the invention;

FIG. 6 is a diagrammatic view in cross-section of a pair of beams that can be propagated simultaneously in accordance with the principles of this invention, showing their positions at the beginning and end of their respective sweeps and their relationship to one another and the space swept by them; and FIG. 7 is a view generally similar to FIG. 5 but illustrating how three beams can be oriented relative to one another in another modified embodiment of the invention.

DETAILED DESCRIPTION OF THE INVENTION

Figure 1:
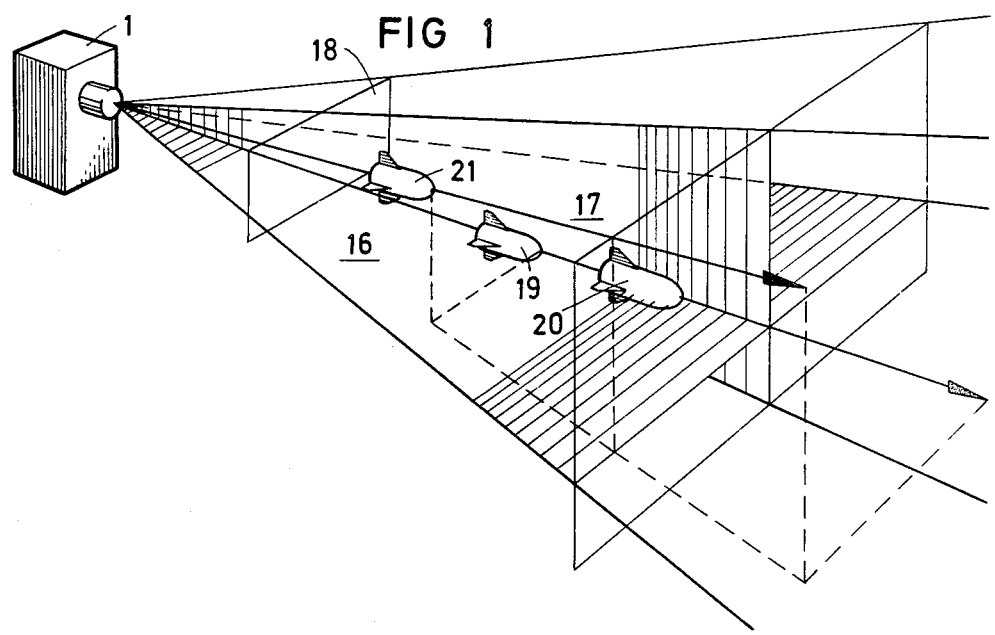
FIG. 1 is a diagrammatic perspective view illustrating a situation in which the invention is applied to the delivery of information from a radiation emitter exclusively to a selected one of three bodies that are present in a space swept by fan-shaped beams from the radiation emitter.
Figure 2:
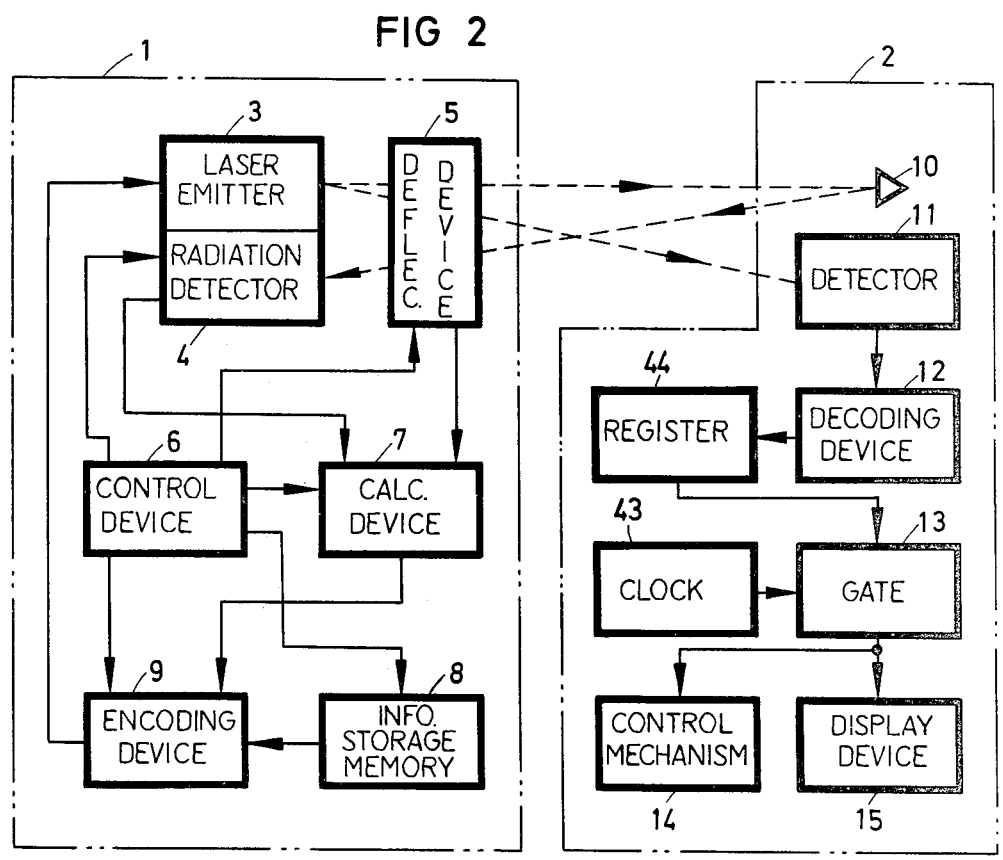
FIG. 2 is a block diagram of transmitting and receiving apparatus embodying the principles of this invention.

Referring now to the accompanying drawings, a system that operates in accordance with the present invention comprises an information transmitting station designated generally by 1 and a receiver 2 for each of the bodies that is to be able to receive information from the station 1. The receivers 2 for all such bodies can be identical because, according to the principles of the invention, it is the location of the body relative to the transmitting station 1 that determines whether or not particular transmitted information will be delivered to that body. It will be understood that the transmitter 1 or the receiver 2, or both of them, could be mobile.

The information transmitting station 1 comprises a radiation emitter 3, which emits modulated radiation, preferably optical radiation. For purposes of example the transmitting station will hereinafter be described as comprising a laser, although it could as well comprise a beamed radio frequency emitter. The transmitting station 1 also comprises a detector or receiver 4 that is responsive to radiation of the type propagated by the emitter 3, together with a deflective device 5 which cooperates with both the emitter 3 and the detector 4. These transmitting station elements are preferably incorporated in a unitary assembly that also comprises a control device 6, a calculating device 7, an information storage memory 8 and a coding device 9.

The radiation emitter 3 in its cooperation with the deflecting device 5 is arranged to emit at least two fan-shaped beams, each having in cross-section (i.e., transversely to the propagation direction) a long dimension that increases in length with increasing distance from the emitter and a short dimension transverse to said long dimension. The beams have their respective long dimensions differently oriented. Such beams can be generated in a well known manner, as by means of two diode lasers or by means of a single diode laser cooperating with a deflecting prism, and therefore details of the beam generating equipment are not illustrated.

The deflection device 5 can comprise, for example, a pair of optical wedges which are rotatable relative to one another and which are moved in response to signals from the control device 6. The function of the deflection device 5 is to cause the emitted radiation to be propagated as beams which have an angular sweeping motion that is preferably periodic and whereby the beams are moved translatingly, each substantially transversely to its long dimension. The beams make their sweeps in the course of a sweep cycle during which each of the beams illuminates a solid angle, that is, a more or less pyramid-shaped space that has the information transmitter at its apex. The beams may make their sweeps either successively or simultaneously, but preferably they have a regularly repetitive sweep cycle, and for the purposes of the invention the sweep cycle must have a predetermined duration.

The beams are modulated or pulsed for the purpose of transmitting information to bodies in the space swept by them. U.S. Pat. No. 4,007,991 discloses a system for transmitting information by means of pulse-modulated beams of the type employed in connection with the present invention, and the system of that patent, although not the only one applicable in the practice of this invention, is particularly suitable.

Each of the bodies to which information is to be transmitted is equipped with a radiation reflector 10. If optical radiation is the transmission medium, as is assumed to be the case for the purposes of the present explanation, the reflector 10 will be a so-called retroreflector whereby received radiation is reflected back in the direction directly opposite to the one from which it arrived at the reflector. Thus, when any of the beams, in the course of its sweep, is intercepted by a reflector 10, radiation of that beam is returned to the transmitting station 1 and is detected by its radiation detector 4.

By means of a known arrangement, such reflected radiation reaches the detector 4 of the station 1 by way of the deflection device 5. If the beams make their sweeps successively, the detector 4 of the station 1 can comprise a single channel. If the beams sweep simultaneously, the detector 4 can have a separate channel for each beam, each such channel preferably being directional, as explained hereinafter, so that it responds only to reflected radiation of the beam with which it is associated. It is also possible to discriminate between reflected radiation of the simultaneously sweeping beams by pulsing the respective beams at different times and range gating the output of the detector 4 so that the beam that provides the source of each returned pulse can be identified on the basis of its pulse time.

Whenever reflected radiation arrives at the detector 4, the detector produces a signal which is fed to the calculating device 7, and the latter, on the basis of the time elapsed between emission of radiation from the emitter and receipt by the detector 4 of a reflection of that radiation, issues an output that corresponds to the distance between the transmitter 1 and the body from which the reflection is received.

The information storage memory 8 contains special information which is valid for a predetermined distance interval or for each of a number of distance intervals which are of concern to the performance of the function or operation for which the system is intended. When the calculating device 7 issues a distance output that corresponds to one of the items of special information stored in the memory 8, the control device 6 causes the memory 8 to issue that item of special information to the coding device 9, which, in turn, causes the emitted beam to be pulsed or modulated in accordance with that special information. In addition to controlling beam modulation, as further explained hereinafter, the control device 6 has the function of coordinating the deflection of the beams, for which it has a connection with the deflection device 5.

Turning now to the receiver 2 with which each of the bodies is equipped, its reflector 10 can comprise a plurality of corner reflector prisms, so arranged in relation to one another that intercepted radiation from the transmitter station 1 will assuredly be reflected back to it in any possible orientation of the carrying body. As an example of such an arrangement, the corner reflecting prisms can be arranged to define the surface of a cylinder, a hemisphere or a cone.

The receiver 2 for each body comprises a radiation detector 11 which is preferably adjacent to its reflector 10 and which is connected through a decoder 12 and a gate 13 with a response device that produces a response to received special information. As illustrated, the response device comprises a directional control servo mechanism 14 that controls movements of the body in accordance with movement command signals which the special information is assumed to comprise. In the case of a manned body, the response device could comprise a display device 15.

When modulated radiation is intercepted by the detector 11 of a receiver 2, the modulations are converted to a signal that is fed to the decoding device 12. The decoding device further converts the signal to an output having a form suitable for feeding to the response device 14 and/or 15. Obviously the decoded output of the decoder 12 can be in the same form that the information had before being encoded at the encoding device 9 of the transmitter station 1. The function of the gate 13 in the receiver 2 is to pass special information signals to the response device 14 and/or 15 only upon the fulfillment of certain conditions which will now be explained with reference to FIGS. 1 and 3.

In FIG. 1, a transmitting station 1 of the type described above emits fan-shaped beams 16 and 17 which successively sweep angularly across a solid angle space 18 that has the station 1 at its apex. In cross-section, the beam 16 has its long dimension oriented horizontally and it sweeps vertically across the space 18, while the beam 17 has its long dimension oriented vertically and it sweeps horizontally across that space. Since the long dimensions of the two beams have equal divergences in their direction of propagation, the space 18 that they sweep has a square cross-section, as best seen in FIG. 3. However, as further explained hereinafter, it is not necessary for the purposes of this invention that the beams have their long cross-section dimensions at right angles to one another, nor that their sweep directions are exactly transverse to their long dimensions; hence, the space swept by the beams need not be square in cross-section but could be rectangular or otherwise elongated in one direction, as would be advantageous in many situations.

FIG. 1 shows three bodies 19, 20 and 21 in the space 18 swept by the beams 16 and 17, each of them equipped with a receiver 2 and thus capable of receiving transmissions from the station 1 that are carried by the beams, and each also capable of reflecting intercepted beam radiation back to the station 1. As shown, two of the bodies 19 and 20 are at different distances from the station 1 but are in the same direction from the station, that is, they are both located on a straight line that extends through the station 1. The third body 21 is at the same distance from the station as the body 19, but it is in a different direction from the station.

Assume for the moment that all of the bodies 19, 20, 21 are at such distances from the station 1 that none of the special information stored in the memory 8 is valid for any of them. In that case the beams would be so modulated, under the control of the control device 6, acting through the encoding device 9, that their modulations would not contain information (so-called zero-information modulation), or would contain information valid throughout the whole of the space swept by them, or would contain information related to the momentary position of each beam, as disclosed in U.S. Pat. No. 4,007,991. The beams would of course be modulated in this same manner if they swept in such directions that no reflections were returned to the station 1 in the course of their sweeps.

However, when one of the beams 16, 17 in the course of a sweep cycle is intercepted by a body from which reflection of the beam radiation is returned to the measuring station 1, the distance between the station and the reflecting body is calculated by means of the calculating device 7, on the basis of the time required for radiation to travel from the emitter 3 and back to the detector 4. If the memory 8 contains special information corresponding to the distance or distance interval thus measured, such information is fed out of the memory to the encoding device 9, and the encoding device, in turn, causes the emitted beam to be modulated in accordance with the special information.

The special information is transmitted in this manner on each beam when its reflected radiation is found to be returned from a body that is at a distance or distance range from the transmitter 1 for which special information is stored in the memory 8, and such transmission of special information on a beam continues as long as reflected radiation from such a body continues to be received by the detector 5, but only during that time. It will be apparent that if a particular body intercepts every beam during the course of a sweep cycle, and that body is at a distance from the station 1 for which special information is valid, then such special information will be transmitted on every beam during the time the beam is being intercepted by that body.

Thus it will always be a condition for transmission of special information that the body that is returning reflection to the station 1 at the time of transmission shall be at a range distance from the station such that the special information is appropriate for it; however, further conditions for transmission of special information can obviously be laid down. Thus, in addition to a predetermined range requirement, transmission of special information, or of a particular item of special information, can be further conditioned upon the transmitting beam having a particular angular position, or being within a prescribed range of angular positions, at the time transmission is to occur.

At each body, special information is accepted only upon the basic condition that the body received special information on each of a predetermined plural number of beams during a predetermined time interval which is relatively short but is at least equal to the time required for a complete beam sweep cycle. At least two beams must be modulated with the special information for purposes of the invention. If more than two beams are used in the system, it is desirable that the basic condition require reception of the special information from all of the beams during the prescribed time interval.

It is the function of the gate 13 of the receiver 2 to determine whether or not this basic condition is met in any given case, and for the purposes of this function the gate 13 cooperates with a clock 43 that measures time intervals of the criterion value. The gate 13, as will be understood, can be so arranged that it accepts special information only upon the fulfillment of one or more further conditions, as for example parity control conditions that prevent acceptance of special information which has not been fully and correctly transmitted and received due to interference or the like.

There are various ways of arranging the gate 13 to ensure fulfillment of the basic requirement for acceptance of special information. For example, the modulation of each beam can include a coded identifier for the particular beam, and the gate can be arranged to accept special information only upon condition that the special information is received along with a code identifier for every beam. If the beams are not identified, the gate can be arranged to accept special information upon condition that it has been received in beam modulations the appropriate number of times during the predetermined time period.

If the conditions for delivery of special information are fulfilled, the gate 13 causes the output of the decoding device 12 to be passed to the response device 14 and/or 15; otherwise the output of the decoding device is not passed on and is in effect discarded. The apparatus in the receiver 2 may comprise a register 44, connected between the decoding device 12 and the gate 13, wherein one or more successive outputs of the decoding device are temporarily stored for purposes of comparison, so that a determination can be made of whether or not the conditions for opening of the gate 13 have been fulfilled.

By reason of the above explained basic condition for acceptance of special information by a body which intercepts beam radiation, it will be seen that the solid angle space 18 that is swept by the several beams can be regarded as comprising a relatively large number of partial solid angles or incremental spaces, in each of which a complete delivery of special information can be effected and each of which is defined by a momentary position of every beam in its sweep. The three bodies 19, 20, 21 that are shown in FIG. 1 are located in such incremental spaces, and in FIG. 3, which is a view in cross-section through the whole of the space swept by the beams, the particular partial solid angles or incremental spaces that those bodies occupy are designated by 22 and 23. Since bodies 19 and 20 are in line with one another and with the station 1, they occupy the same incremental space 22; but they are at different distances from the station 1, and for all practical purposes the nearer body 19 blocks radiation to the body 20 and reflections from it. Therefore, distances in the incremental space 22 will be measured to the nearer body 19, and that body will receive special information valid for its distance from the station. The body 20 will receive either zero information or incomplete information, inasmuch as body 19 will prevent body 20 from receiving a complete transmission of special information on every beam during the course of a complete sweep cycle, and therefore the gate 13 in body 20 will prevent special information from being accepted and fed to its response device 14 and/or 15, thus preventing undesired responses of the body 20.

It will be evident that either or both of the bodies 19 and 21, when and if they are at a predetermined distance from the station 1 for which special information is valid, can receive and accept special information, since the basic condition for acceptance of special information can be fulfilled at each of them.

A special problem arises in the event that the same special information is to be transmitted to both of the bodies 19 and 21 because they are at the same distance from the station 1 so that the special information is valid for both of them. The special information will be delivered to both of those bodies because each can intercept both of the beams 16 and 17 during a complete sweep cycle, but (as can be seen from FIG. 3) the special information could also be delivered to a body $19^I$ that might be present in either of the incremental spaces 24 or 24', notwithstanding that the special information would not be appropriate for the body $19^I$, owing to its being at a distance from the station 1 for which the special information would not be valid. This problem of possible undesired transmissions can arise when the number of bodies in the space swept by the beams is greater than the number of beams sweeping that space.

According to a modified form of the present invention, this special problem is solved by imposing a characterizing coded sign upon the modulation of each beam whenever, in any given momentary position of that beam, its reflected radiation is received substantially simultaneously from two bodies that are at different distances from the station 1. Thus, referring to FIG. 3, the characterizing sign is included in modulation of the beam 16 during the time it is in its momentary position of sweep designated by $16^I$, during which its radiation is reflected back from both of the bodies $19^I$ and 21; but the characterizing sign is not encoded in modulation of beam 16 during the time it is in its momentary position designated by $16^{II}$, when its reflected radiation is received only from the body 19. In like manner, the characterizing sign is impressed upon the beam 17 only when it is in its momentary position designated by $17^I$, when its radiation is reflected by both of the bodies $19^I$ and 19, but not in its position $17^{II}$ at which it is intercepted only by the body 21. The gate 13 is each receiver 2 is so arranged that even if special information is received from every beam during a sweep cycle, such special information will nevertheless be rejected (i.e., not passed to the response device 14 and/or 15) if the characterizing sign is also included with the transmission received with every beam.

This is to say that it is a further condition for the acceptance of special information that the characterizing sign must be absent from the transmission received on at least one beam. Thus, in the example here given, the body 21 will receive the characterizing sign from beam 16 but not from beam 17, and the receiver 2 at the body 21 will therefore accept special information; the body 19 will receive the characterizing sign from beam 17 but not from beam 16 and therefore it will likewise accept special information; but the body $19^I$ will receive the characterizing sign from both of beams 16 and 17 and will therefore reject special information notwithstanding that there has been compliance with the basic condition that during a predetermined time interval (not shorter than the duration of a sweep cycle) the body $19^I$ has received special information from all beams.

With the particular beam arrangement and distribution of bodies illustrated in FIG. 3, it would not be possible to deliver special information exclusively to the body $19^I$ if the characterizing sign were automatically applied whenever reflected radiation of a beam was simultaneously received from two bodies. Hence the characterizing sign expedient is useful in a situation like that illustrated when it is normally desired to deliver the special information to the two bodies that are at equal and appropriate distances from the station 1 and not to a third body at a different distance. This would be the case with gunnery practice scoring equipment, with which delivery of special information to targets at equal range distances from the weapon location would be of special interest.

FIG. 4 suggests a form that the characterizing sign can take when the special information is transmitted in the form of a binary coded pulse modulation of each beam. The empty squares denote ones and zeros of the coded special information, respectively transmitted in the form of radiation and lack of radiation during successive short intervals of preferably equal duration, and the characterizing sign can consist of a binary one in the square designated by X.

Under certain circumstances it is advantageous for the beams to move in a fixed relationship to one another like that shown in FIG. 5. This permits the mechanism of the deflection device 5 to be substantially simplified. In the arrangement shown in FIG. 5, the two beams 25 and 26 both sweep horizontally, as denoted by arrows 27. Since the two beams have their long dimensions oriented at different angles oblique to the horizontal, each beam sweeps substantially transversely to its long dimension. With the beams 25, 26 sweeping horizontally, it will be apparent that the solid angle space 38 that they sweep can be substantially elongated horizontally, making the arrangement especially suitable for transmissions to bodies confined to the surface of the land or water. However, with the arrangement shown in FIG. 6 there are spaces 28, 29 at each side of the space 38 that are swept, in each case, by only one of the two beams. Of course special information could not be delivered to bodies in the spaces 28 and 29 because the basic condition could not be fulfilled at such bodies they they receive special information from both of the two beams.

With the arrangement shown in FIG. 6, the two beams may be making their sweeps simultaneously, although spaced apart in the sweep direction. To prevent reflections from either beam from being detected at the station 1 by the detector channel associated with the other beam, the detector 4 at the station 1 can have fields of response or scanning windows 30, 31, which are substantially matched to the cross-section shape and size of the beams 25 and 26, respectively, and which move with their associated beams. FIG. 5 represents the beams 25 and 26 and their respective fields of response 30 and 31 as seen in cross-section at an arbitrary distance in front of the station 1. It will be understood that the fields of response 30, 31 can be defined by scanning means (not shown) associated with each detector channel, whereby each channel of the detector 4 is caused to scan substantially the same portion of space that is illuminated by its associated beam 25 or 26.

In addition to preventing reflections from one beam from being received by the detector means for the other, provision of the restricted scanning windows or fields of response 30 and 31 makes for a better signal-to-noise relationship and consequently a greater sensitivity and distance range than would be the case if the receiver 4 had a single field of reception that covered both beams or the entire space swept by the beams.

To further increase discrimination with the embodiment of the system shown in FIGS. 5 and 6, it is desirable that the optical system be provided with a shield, preferably placed in an intermediate image plane, for masking off the spaces 28 and 29 that are each swept by only one of the two beams 25, 26, thereby ensuring fulfillment of the requirement that for every reflection which is received and registered in one channel of the receiver 4 there shall be a corresponding reflection received and registered in its other channel. This requirement is of course a precondition for transmission of special information in manner to enable the basic condition for acceptance to be fulfilled at the body intended to receive it.

As pointed out above, the possibility exists that special information can be delivered to an inappropriate body located in "forbidden" partial spaces, such as are designated by 24 and 24' in FIG. 3, when two other bodies are present in partial spaces such as are designated by 22 and 23 and only two beams 16 and 17 are used to sweep the space 18. Since such "forbidden" locations can occur whenever the number of bodies in the swept space is greater than the number of beams sweeping the space, the delivery of information to inappropriate bodies can be prevented or minimized by increasing the number of beams that sweep the space in which the bodies appear. Thus, FIG. 7 illustrates a beam arrangement in which there are three beams 32, 33, 34 which have their long cross-section dimensions oriented at different angles and which are all swept in a common direction that is substantially transverse to their long dimensions. For each beam 32, 33, 34 there is a field of response or scanning window 35, 36 37, respectively, which is matched to the shape and size of the beam cross-section and moves with the beam.

Although laser radiation is particularly suitable for the practice of the present invention, it will be apparent that any non-coherent optical radiation could be employed that was capable of being modulated. However, it is advantageous that the radiation be as nearly as possible monochromatic so that a narrow-band optical filter can be used in conjunction with each of the detectors 4 and 11, to suppress disturbing background radiation and provide the system with high sensitivity.

From the foregoing description taken with the accompanying drawings it will be apparent that this invention provides a method and apparatus for transmitting information by means of flatwise sweeping fan-shaped beams exclusively to a selected one of a plurality of bodies that may be present in a space swept by the beams and at a predetermined distance from an emitter from which the beams are propagated, and that the system of this invention permits all of the bodies to be identically equipped inasmuch as delivery of information to a particular body is dependent solely upon the location of that body.

The invention is defined by the following claims:

I claim:

1. A method whereby information that is transmitted from a location at the apex of a solid angle space in which a plurality of bodies may be present can be delivered exclusively to one of said bodies, selected on the basis of a criterion comprising a requirement that said body is at a distance from said location such that said information is appropriate for said body, said information being transmitted by modulation of at least two fan-shaped beams of radiation that are emitted from said location, each beam being long and narrow in cross-section and being swept angularly across said space substantially transversely to its long cross-section dimension, the several beams having their respective long cross-section dimensions differently oriented and being swept in a sweep cycle of a predetermined duration during which every beam makes at least one sweep across said space, and each of said bodies having means for reflecting beam radiation back to said location, means for detecting beam radiation received from said location and means for accepting or rejecting information contained in modulated beam radiation, said method being characterized by:

A. at said location, by measurement of the time required for the radiation of each of said at least two beams to be returned to said location by reflection, ascertaining, as to each of the bodies from which reflected beam radiation is returned, whether or not the body is at said distance from said location;

B. modulating each of said at least two beams in correspondence with said information only during the time in its sweep when reflection of the radiation of that beam is received at said location and ascertained to have been returned from a body at said distance from said location; and C. at each body, accepting said information only when radiation modulated in correspondence with said information is detected from each of said at least two beams within a predetermined time interval which is at least as long as said sweep cycle duration.

2. The method of claim 1, further characterized by:

D. whenever during the sweep of a beam reflections of the radiation of that beam are returned to said location substantially simultaneously from plural bodies, and it is ascertained that not all of said bodies are at said predetermined distance from said location, so modulating said beam that said information is accompanied by a characterizing sign; and E. at each body, accepting specific information only upon the further condition that the received radiation of at least one of the beams is not modulated to include said characterizing sign.

3. The method of claim 1 wherein the whole of said solid angle space is swept by every beam in its sweep.

4. The method of claim 1 wherein said criterion comprises a requirement that said distance be any one of a predetermined range of distances between said location and said body.

5. The method of claim 1 wherein said criterion comprises a further requirement that at least one of said beams be in a predetermined angular position of its sweep at the time when reflection of its radiation is received at said location.

6. The method of claim 1, further characterized by: at said location, so limiting the field within which reflected radiation of each beam can be received that said field has a cross-section which substantially corresponds in shape, size and orientation with that of the beam and sweeps in unison with the beam so as to be substantially coincident with the beam.

7. Apparatus whereby information can be transmitted by means of modulated radiation from a location which is at the apex of a solid angle space in which a plurality of bodies may be present and whereby said information can be conveyed exclusively to one such body that is in said space and is at a distance from said location such that said information is valid for said body, said apparatus comprising:
- A. beam generating means at said location
  - (1) for emitting, during the course of a sweep cycle of predetermined duration, at least two modulatable, fan-shaped, beams of radiation, each having a long, narrow cross-section and having its long cross-section dimension oriented differently than that of the others, and
  - (2) for causing each of said beams to sweep angularly across the whole of said space in a direction substantially transverse to its long cross-section dimension;
- B. reflector means on each of said bodies whereby radiation reaching the body is reflected back to the source from which it was emitted;
- C. detector means at said location for detecting beam radiations reflected back to said location from bodies in said space;
- D. measuring means at said location, connected with said beam generating means and said detector means, for ascertaining, on the basis of the time required for radiation of a beam to be returned to said location by reflection, whether or not each body that reflects beam radiation back to said location is at said distance from said location;
- E. modulating means at said location for modulating each of said at least two beams in correspondence with said information;
- F. control means at said location, connected with said measuring means and with said modulating means, for modulating each of said at least two beams in correspondence with said information only during times when reflection of that beam is detected by said detector means and such reflection is ascertained to be returned from a body which is at said distance from said location;
- G. other detector means, at each body, for detecting modulated beam radiation; and
- H. gate means at each body, connected with said other detector means and with clock means, for accepting said information only upon condition that radiation modulated in correspondence with said information is received at the body from each of said at least two beams during the course of a predetermined time interval which is at least as long as said sweep cycle duration.

* * * * *